Dec. 14, 1965  J. J. CHYLE  3,223,818
METHOD OF WELDING
Filed April 27, 1961
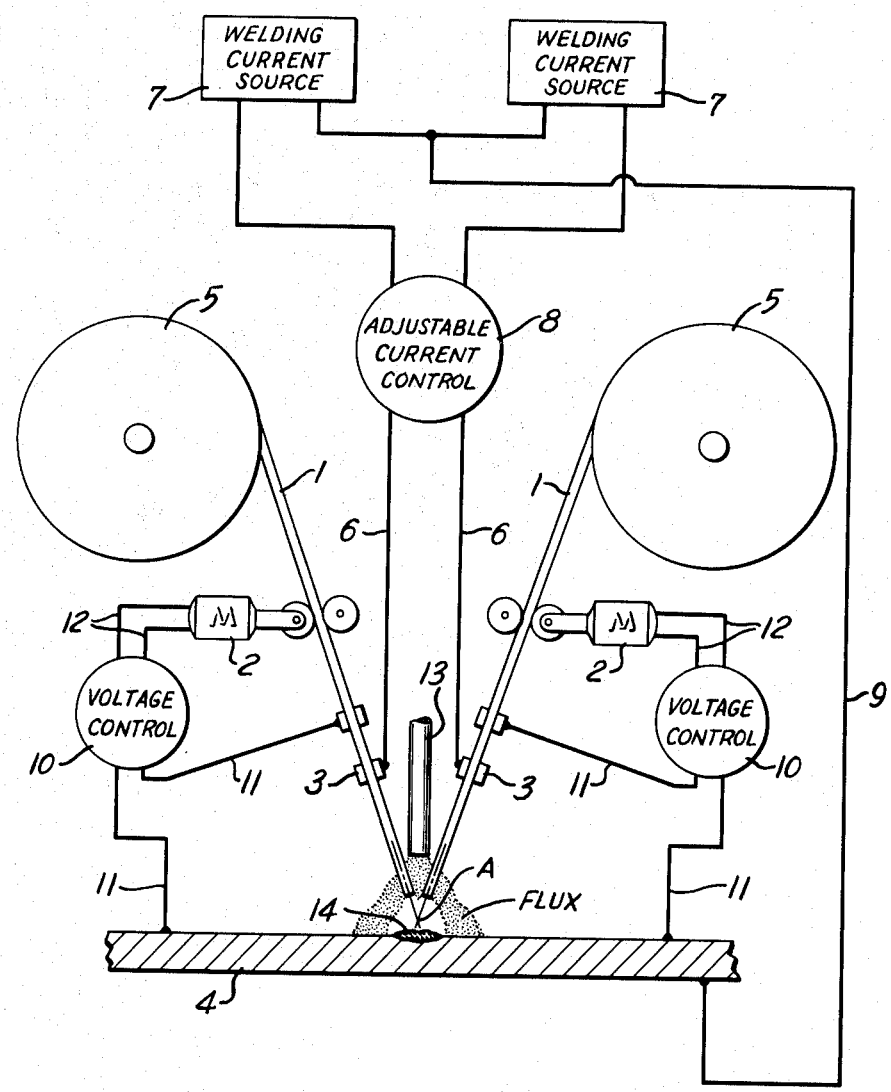
INVENTOR.
John J. Chyle
BY
Andrus & Starke
Attorneys 3,223,818
METHOD OF WELDING
John J. Chyle, Wauwatosa, Wis., assignor to A. O. Smith Corporation, Milwaukee, Wis., a corporation of New York
Filed Apr. 27, 1961, Ser. No. 106,031
7 Claims. (Cl. 219—73)

The application is a continuation-in-part of application Serial No. 6,996, filed February 5, 1960, now abandoned, of the same inventor.

This invention relates to a method of welding and to a welded structure produced thereby.

In nuclear power applications, there has been an increased use of nickel base alloys for welding and cladding or lining for stainless steel and carbon steel vessels, such as reactors and the like. Generally, nickel base-chromium-iron alloys, such as Inconel, which is an alloy of about 80% nickel, 14% chromium and 6% iron, are clad or deposited on the base metal by use of an inert gas or coated electrode process. However, it has been found that when the nickel base weld deposit or overlay is subjected to elevated temperatures such as stress relieving heat treatments, embrittlement of the weld results as shown by marked increase in hardness and lowering of ductility.

The present invention is directed to a method of depositing a nickel-base alloy on base metals which eliminates age-hardening and embrittlement of the weld. The process produces sound welds free from porosity, fissuring or cracking and composed of elements which do not have a long half-life of radioactivity.

This invention specifically covers the use of a special flux or coating which is used with nickel-base core wire for overlay, butt, and fillet welding of carbon, low alloy high tensile stainless, and high nickel alloy plate materials. During the welding, a quantity of molybdenum is introduced into the molten weld metal in an amount such that the molybdenum comprises from 1.0% to 20.0% by weight of the weld metal. The molybdenum alloys with the nickel base weld metal to produce a sound weld deposit which is free of porosity and fissures, and which will not age-harden when subjected to elevated temperatures.

As a more specific illustration of the invention, the arc is blanketed with a flux containing molybdenum thus added to the submerged arc flux alloys with the nickel-base weld metal to produce the desired properties in the weld deposit.

As modified forms of the invention, the molybdenum can be added to the flux coating of a coated electrode or it can be alloyed with the electrode. In this case, the molybdenum will also alloy with the nickel base weld metal to provide a weld deposit having suitable physical and mechanical properties and which will be free from porosity, fissures and other defects.

By adding the molybdenum to the submerged arc flux or to the electrode coating, a standard commercially available nickel-base electrode welding wire or filler wire can be used, thereby reducing the overall cost of the welding.

Other objects and advantages will appear in the course of the following description.

The drawing illustrates the best mode presently contemplated of carrying out the invention.

The drawing illustrates a series arc welding apparatus for carrying out the process of the invention. As shown in the drawing, two nickel-base bare electrode wires 1 are fed by feed motors 2 through contact nozzles 3 toward the workpiece 4. The electrodes are stored on reels 5 and fed at an acute angle to each other so that the extended longitudinal axes of the electrodes intersect at a point A located above the surface of the workpiece 4.

The contact nozzles 3 are connected by leads 6 to a suitable A.C. or D.C. welding current source 7 through an adjustable current control 8 so that the electrodes are in series with each other in the circuit. The current sources 7 are connected to the workpiece 4 by a common lead 9.

The electrodes 1 are automatically fed by the feed motors 2 at a rate such that the voltage between each electrode and the workpiece is maintained substantially constant by voltage controls 10 having input circuits 11 connected to the electrode and workpiece, respectively, and output circuits 12 connected to feed motor 2.

During welding, a flux material is supplied through a nozzle 13 to cover the zone of the welding as the welding progresses along the workpiece. As the electrodes 1 are progressively melted, they are moved along a desired path over the surface of the workpiece or conversely, the workpiece is moved under the electrodes to thereby lay on a bead 14 of weld metal on the surface of the workpiece.

The electrodes 1 may be in the form of round wire or in the form of strip in which the width of the strip has a substantially greater dimension than the thickness thereof. The electrode is a nickel base alloy and generally comprises 10% to 20% chromium, 1% to 15% iron and the balance nickel. The electrode may also contain minor amounts of silicon and manganese and with these elements the electrode has the following general range of composition by weight:

| | Percent |
|---|---|
| Chromium | 10–20 |
| Iron | .01–15 |
| Silicon | .01–2.0 |
| Manganese | .01–3.0 |
| Nickel | Balance |

Small amounts of impurities or other alloying metals, such as carbon, cobalt, columbium and the like, may also be present in the nickel base alloy, depending on the particular applications and service conditions required.

Specific examples of the bare electrode wire compositions falling within the above range are as follows in weight percent:

*Alloy*

| | 1 | 2 | 3 | 4 |
|---|---|---|---|---|
| Chromium | 16.0 | 20.0 | 13.0 | 15.0 |
| Iron | 7.5 | 0.50 | 7.0 | 7.0 |
| Silicon | 0.35 | 0.20 | 0.50 | 0.30 |
| Manganese | 0.05 | 0.50 | 0.50 | 0.20 |
| Columbium | | | 2.0 | |
| Molybdenum | | | | 0.50 |
| Nickel | 76.10 | 78.80 | 77.00 | 77.00 |

Metals which tend to produce an age-hardening effect, such as aluminum, titanium and the like, should not exceed 1% in the weld deposit.

The flux material to be used may be any of the conventional fluxes commonly used in submerged arc welding procseses. The fluxes are generally calcium, magnesium and aluminum silicates and in addition contain fluorides. Molybdenum is added to the flux in an amount such that the weld deposit will contain between 1.0% to 20% by weight of molybdenum. Molybdenum can be added to the flux either as molybdenum metal or as an alloy, such as ferro-molybdenum or as a molybdenum compound, such as the oxide of molybdenum or any other compound of molybdenum compatible with the weld metal analysis. The molybdenum is mixed with the flux and a small amount of adhesive or binder is employed to prevent the materials from separating and to maintain a homogeneous consistency. For most welding operations, about 1.0% to 20% by weight of molybdenum is used with respect to the total weight of flux. The particular weight of molybdenum added to the flux depends on the desired molybdenum content in the weld deposit.

Nickel powder can also be added to the flux in quantities ranging from 2.5% to 20.0% by weight, depending on the nickel content desired in the weld deposit.

The base metal to which the weld is applied may be a carbon steel, such as ASTM A–285, A–201, A–212 or A–302 or a nickel base alloy, such as ASTM B–168 or a stainless steel, such as AISI 304, 308, 309, 316, or 410.

In the series arc welding process described above, the height of the intersection A of the longitudinal axes of the electrodes above the surface of the workpiece should be maintained in the range of 3/32 to 7/32 of an inch. If this height is too great, the weld metal will be deposited within the flux layer and no fusion to the base metal will occur. If the height is less than the above mentioned range, excessive dilution or penetration into the base metal will occur. It is desired to keep the dilution to a minimum and in no case should it exceed 15%.

In the series arc welding process, using a 5/32 inch diameter electrode wire, the current will be within the range of 340 to 370 amperes, the voltage will be within the range of 24 to 27 volts and the speed of travel of the electrodes with respect to the workpiece will be in the range of 8 to 12 inches per minute. For other wire diameters, the conditions would be proportional.

A specific illustration of the process of the invention using a series arc welding apparatus is as follows:

Base plate—ASTM 285 carbon steel

Electrode composition (ASTM B166–58T Specification):

| | Percent |
|---|---|
| Chromium | 16.02 |
| Iron | 7.60 |
| Manganese | 0.05 |
| Silicon | 0.38 |
| Nickel | 75.95 |

Electrode diameter—5/32 inch
Welding current—A.C.
Amperes—360
Volts—24
Speed of travel—10 inches per minute
Speed of electrode feed—56 inches per minute
Intersection height—5/32 inch Flux composition (elemental analysis):

| | Parts by weight |
|---|---|
| $Al_2O_3$ | 2.5 |
| Ca as CaO | 31.67 |
| C | 2.23 |
| F | 7.32 |
| Fe | 1.87 |
| Mn | 3.54 |
| Mg as MgO | 1.80 |
| Si as $SiO_2$ | 25.96 |
| Na as $Na_2O$ | 3.30 |
| Fe-Mo | 20 |

Weld deposit composition:

| | Weight percent |
|---|---|
| Chromium | 14.97 |
| Iron | 11.20 |
| Silicon | 0.70 |
| Manganese | 0.52 |
| Molybdenum | 7.17 |
| Nickel | 65.44 |

The resulting weld deposit was sound with no evidence of porosity, fissuring or cracking. When the weld metal was subjected to age hardening heat treatments of 1300° F. for 24 hours there was no marked increase in hardness or reduction in ductility; thus indicating that the weld deposit is not age hardening.

In addition to series submerged arc overlay welding, the submerged arc flux containing molybdenum can be used in combination with the nickel-base electrode for welding in a groove or butt joint as well as for fillet welding.

The molybdenum can also be incorporated in an electrode coating when using coated electrodes in place of submerged arc welding. In this case, the nickel-base electrode has a similar composition to that used with the submerged arc process, and the electrode is covered with a flux coating containing molydenum in an amount so that the weld deposit will contain from 1.0 to 20% by weight of molybdenum. During welding, the molybdenum in the coating will alloy with the non-age hardening weld metal to provide a weld bead or deposit which is free from porosity, cracking and fissures.

A specific illustration of the process of the invention using a coated electrode is as follows:

Base plate—ASTM 285 carbon steel

Electrode composition:

| | Weight percent |
|---|---|
| Chromium | 17.7 |
| Manganese | 0.25 |
| Silicon | 0.22 |
| Iron | 8.45 |
| Carbon | 0.05 |
| Nickel | 73.33 |

Electrode diameter—5/32 inch

Electrode coating:

| | Parts by weight |
|---|---|
| $CaCO_3$ | 30.0 |
| Rutile | 28.0 |
| $Al_2O_3$ | 5.0 |
| CaF | 12.0 |
| FeMn | 4.0 |
| FeSi | 6.0 |
| $ZrO_2$ | 4.0 |
| $KSiO_3$ (41° Baumé) | 25.0 |

Polarity—Reverse; D.C.
Amperes—150–155
Volts—26–27
Type of weld—Spaced V groove, 40° overall scarf—1/2 inch gap Weld deposit composition:

| | Weight percent |
|---|---|
| Cr | 14.20 |
| Mn | 1.48 |
| Si | 0.32 |
| Mo | 1.60 |
| Fe | 12.86 |
| Ni | 69.54 |

When the weld metal was subjected to age hardening heat treatments of 1300° F. for 24 hours, there was no marked increase in hardness or reduction in ductility; thus indicating that the weld deposit is not age hardening.

In a modified form of the invention the molybdenum may be alloyed with the nickel-base electrode rather than being incorporated in the flux or electrode coating. In this form, the electrode has the following composition by weight:

| | Percent |
|---|---|
| Chromium | 10–20 |
| Iron | 0.01–15.0 |
| Molybdenum | 1–20 |
| Silicon | 0.01–2.0 |
| Manganese | 0.01–3.0 |
| Nickel | Balance |

The weld deposit produced by the method of the invention will have the following general composition by weight:

| | Percent |
|---|---|
| Chromium | 7–20 |
| Iron | 0.01–25.0 |
| Molybdenum | 1–20 |

| | Percent |
|---|---|
| Silicon | 0.01–2.0 |
| Manganese | 0.01–4.0 |
| Carbon | 0.02–0.25 |
| Nickel | Balance |

The weld deposit may have an increased range of iron, silicon and carbon over that in the electrode due to "pickup" from the base metal and flux.

The specific amount of increase in the iron content of the weld deposit will depend on the base metal welded, the amount of dilution or penetration, the pass which was analyzed and the welding process used.

Various modes of carrying out the invention are contemplated as being within the scope of the following claims particularly pointing out and distinctly claiming the subject matter which is regarded as the invention.

I claim:

1. A process of welding, comprising establishing an arc at an end of an electrode immediately adjacent a workpiece to thereby provide a molten body of weld metal, said electrode consisting essentially by weight of:

| | Percent |
|---|---|
| Chromium | 10–20 |
| Iron | 0.01–15 |
| Silicon | 0.01–2.0 |
| Manganese | 0.01–3.0 |
| Nickel | Balance | and introducing a welding flux containing molybdenum to the arc, said molybdenum alloying with the molten weld metal and being present in said flux in an amount sufficient to provide the solidified weld metal with a molybdenum content in the range of 1.0% to 20% by weight.

2. A process of welding, comprising establishing an arc at an end of an electrode immediately adjacent a workpiece to thereby provide a molten body of weld metal, said electrode consisting essentially by weight of:

| | Percent |
|---|---|
| Chromium | 10–20 |
| Iron | 0.01–15 |
| Silicon | 0.01–2.0 |
| Manganese | 0.01–3.0 |
| Nickel | Balance | said workpiece being selected from the group consisting of carbon steel, stainless steel and nickel-base alloys, mixing a finely divided material containing molybdenum with a welding flux to provide a flux mixture, and introducing said flux mixture to the arc with the molybdenum alloying with the molten weld metal and being present in said flux mixture in an amount sufficient to provide the solidified weld metal with a molybdenum content in the range of 1.0% to 20% by weight.

3. The method of claim 1 and including the step of maintaining said point of intersection in the range of 3/32 to 7/32 of an inch above the surface of the workpiece.

4. A method of submerged series arc welding, comprising the steps of feeding at least two consumable nickel base-chromium-iron alloy electrodes at an acute angle to each other toward a workpiece so that the longitudinal axes of said electrodes intersect at a point located above the surface of said workpiece, said electrode having the following composition by weight:

| | Percent |
|---|---|
| Chromium | 10–20 |
| Iron | 0.01–15 |
| Silicon | 0.01–2.0 |
| Manganese | 0.01–3.0 |
| Nickel | Balance | blanketing the ends of said electrodes and the surface of the workpiece with a welding flux containing from 1.0% to 20.0% of molybdenum, and supplying a welding current through the electrodes to establish an arc between the ends of said electrodes within said flux to thereby provide a molten body of weld metal having a molybdenum content in the range of 1.0% to 20.0%, said molybdenum serving to eliminate porosity, fissuring and cracking of the solidified weld deposit.

5. A process of welding, comprising the steps of establishing an arc at an end of a consumable electrode adjacent a workpiece to thereby provide a molten body of weld metal, said electrode having the following composition by weight:

| | Percent |
|---|---|
| Chromium | 10–20 |
| Iron | 0.01–15 |
| Molybdenum | 1–20 |
| Silicon | 0.01–2.0 |
| Manganese | 0.01–3.0 |
| Nickel | Balance | said workpiece being selected from the group consisting of carbon steel, stainless steel and nickel base alloys, and feeding the electrode toward the workpiece at a rate determined by the rate of consumption of the electrode to provide a generally constant arc length, said molybdenum producing a sound weld deposit free of porosity and fissures and substantially free of age hardening effects when subjected to elevated temperatures at which age hardening would normally occur.

6. A method of welding, comprising establishing an arc at an end of a nickel base alloy electrode adjacent a workpiece to melt the electrode and provide a molten weld deposit, said electrode having the following range of composition by weight:

| | Percent |
|---|---|
| Chromium | 10–20 |
| Iron | 1–15 |
| Manganese, maximum | 1.0 |
| Silicon, maximum | 0.75 |
| Nickel | Balance | said electrode having a flux coating thereon containing an amount of molybdenum sufficient to provide the weld deposit with a molybdenum content in the range of 1.0 to 20% by weight, said molybdenum serving to prevent porosity and fissuring of the weld deposit.

7. The method of claim 6 in which the molybdenum is added to the flux coating as a finely divided material selected from the group consisting of metallic molybdenum and ferro-molybdenum.

References Cited by the Examiner

UNITED STATES PATENTS

| | | | |
|---|---|---|---|
| 779,886 | 1/1905 | Stewart | 29—484 |
| 1,483,298 | 2/1924 | Girin | 75—171 |
| 1,794,983 | 3/1931 | Ritter | 219—145 |
| 1,836,317 | 12/1931 | Franks | 75—171 |
| 1,939,467 | 12/1933 | Short et al. | 29—484 |
| 2,156,298 | 5/1939 | Leitner. | |
| 2,156,306 | 5/1939 | Rupatz. | |
| 2,239,465 | 4/1941 | Nepoti et al. | 219—145 |
| 2,241,572 | 5/1941 | Armstrong | 219—73 |
| 2,247,643 | 7/1941 | Rohn | 75—171 |
| 2,401,722 | 6/1946 | Clapp | 219—73 |
| 2,415,573 | 2/1947 | Adams et al. | 189—36 |
| 2,587,275 | 2/1952 | Bash | 75—171 |
| 2,669,640 | 2/1954 | Outcalt | 219—76 |
| 2,822,897 | 2/1958 | Peterson | 189—36 |
| 2,875,104 | 2/1959 | Bergh | 219—146 |
| 2,927,990 | 3/1960 | Johnson | 219—73 |
| 2,955,934 | 10/1960 | Emery | 75—171 |
| 3,008,822 | 11/1961 | Boyd | 75—171 |

HYLAND BIZOT, *Primary Examiner.*

DAVID L. RECK, *Examiner.*